United States Patent
Kummer

Patent Number: 6,053,297
Date of Patent: Apr. 25, 2000

[54] AUTOMATICALLY ADJUSTING FRICTION CLUTCH WITH TORSION SPRING HOUSING

[75] Inventor: Martin E. Kummer, Auburn, Ind.

[73] Assignee: Eaton Corporation, Cleveland, Ohio

[21] Appl. No.: 09/215,695

[22] Filed: Dec. 18, 1998

[51] Int. Cl.$^7$ .................................................. F16D 13/50
[52] U.S. Cl. .................................. 192/70.27; 192/70.25; 192/111 A
[58] Field of Search .............................. 192/70.25, 70.27, 192/111 A; 267/154, 155

[56] References Cited

U.S. PATENT DOCUMENTS

| | | | |
|---|---|---|---|
| 5,069,322 | 12/1991 | Mizukami et al. | 192/70.25 |
| 5,129,799 | 7/1992 | Scheldorf | 267/154 |
| 5,251,737 | 10/1993 | Flotow et al. | 192/111 A |
| 5,566,804 | 10/1996 | Gochenour et al. | 192/70.25 |
| 5,791,448 | 8/1998 | Gochenour et al. | 192/70.25 |

OTHER PUBLICATIONS

Pending U.S. Patent Application Serial No. 08/993,164, filed on Dec. 18, 1997, entitled "Automatically Adjusting Friction Clutch With Overadjustment Projection and Reset Mechanism".

*Primary Examiner*—Charles A Marmor
*Assistant Examiner*—Tisha D. Waddell
*Attorney, Agent, or Firm*—Dykema Gossett PLLC

[57] ABSTRACT

A friction clutch for a motor vehicle includes a cover, a pressure plate, a biasing member and an adjustment mechanism. The adjustment mechanism includes a first annular cam, a second annular cam and a torsional spring and housing assembly. The cover has an axis of rotation. The pressure plate is coupled to the cover for rotation therewith about the axis. The pressure plate has a frictional engagement surface substantially normal to the axis. The biasing member is interposed between the cover and the pressure plate, and biases the pressure plate toward an engaged pressure plate position. The adjustment mechanism is centered about the axis and is located at a first radial distance from the axis. The adjustment mechanism is operably disposed between the biasing member and one of the pressure plate and the cover. The first annular cam is rotatably fixed with respect to the pressure plate and the cover. The second annular cam is rotatable relative to the first annular cam. Both cams have a plurality of mutually engaged cam surfaces configured such that rotation of the second cam relative to the first cam in a first direct increases a height of the adjustment mechanism. The torsional spring and housing assembly includes a torsional spring and a housing. The spring is coiled around an inner diameter portion of the housing. The spring arcuately overlaps itself. The spring has a first end connected to the second annular cam ring. The spring has a second end connected to the housing. The housing as an inner diameter portion which serves as a spool for the torsional spring. The housing has a first flange extending radially outwardly from the inner diameter portion. The flange and the inner diameter portion define a channel in which the torsional spring is disposed and retained. The housing is rotatably fixed relative to the pressure plate.

13 Claims, 8 Drawing Sheets

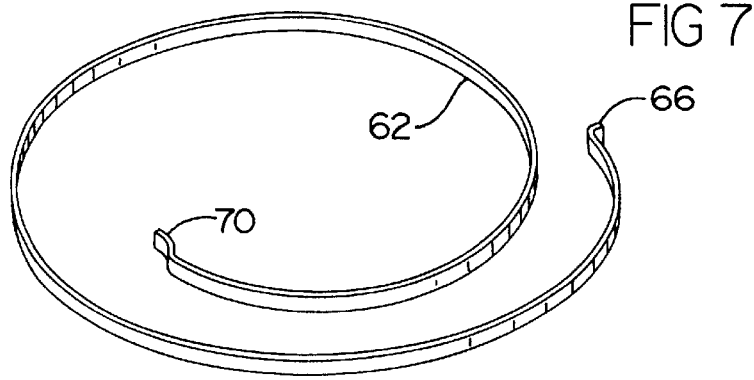
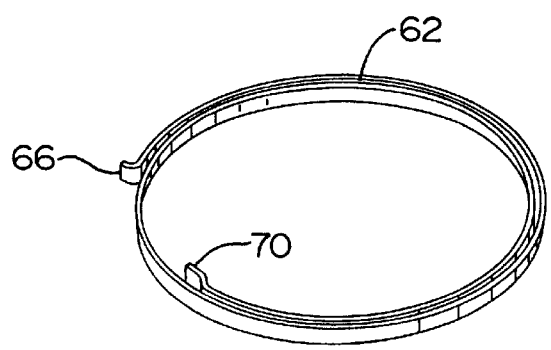
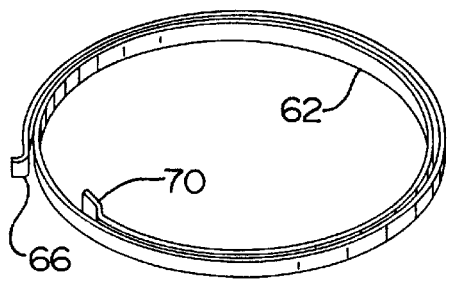
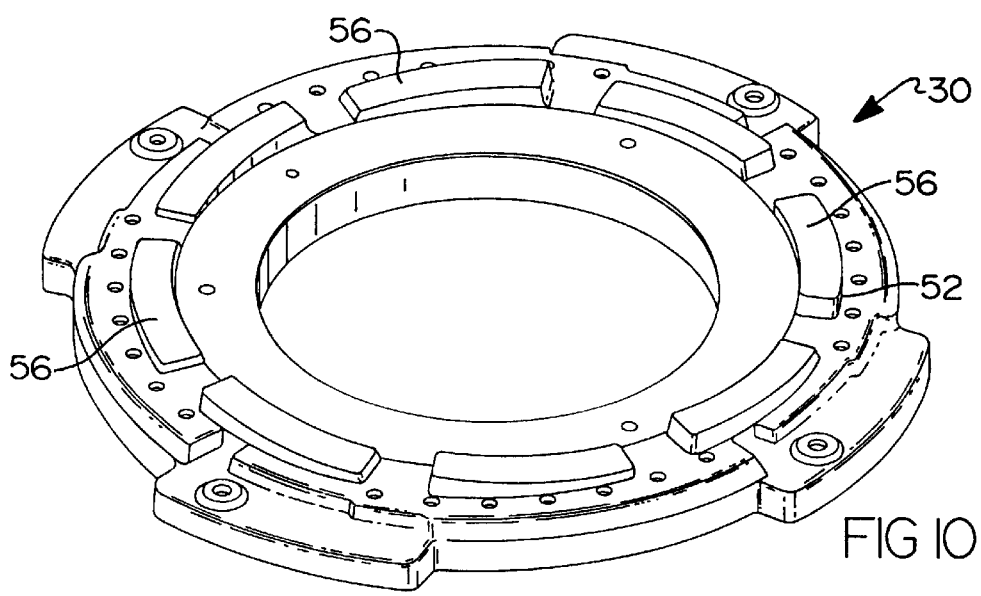

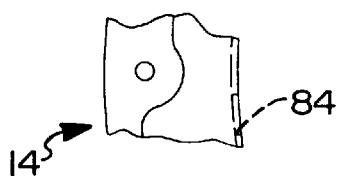
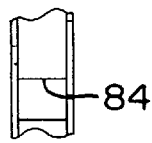
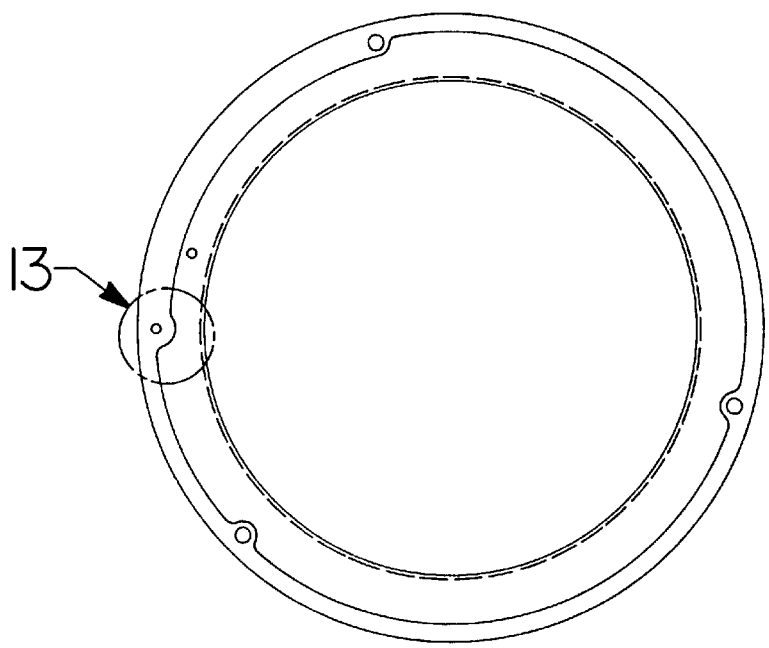
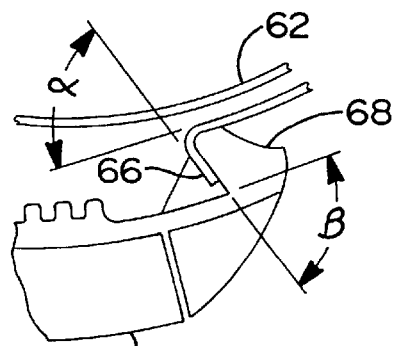

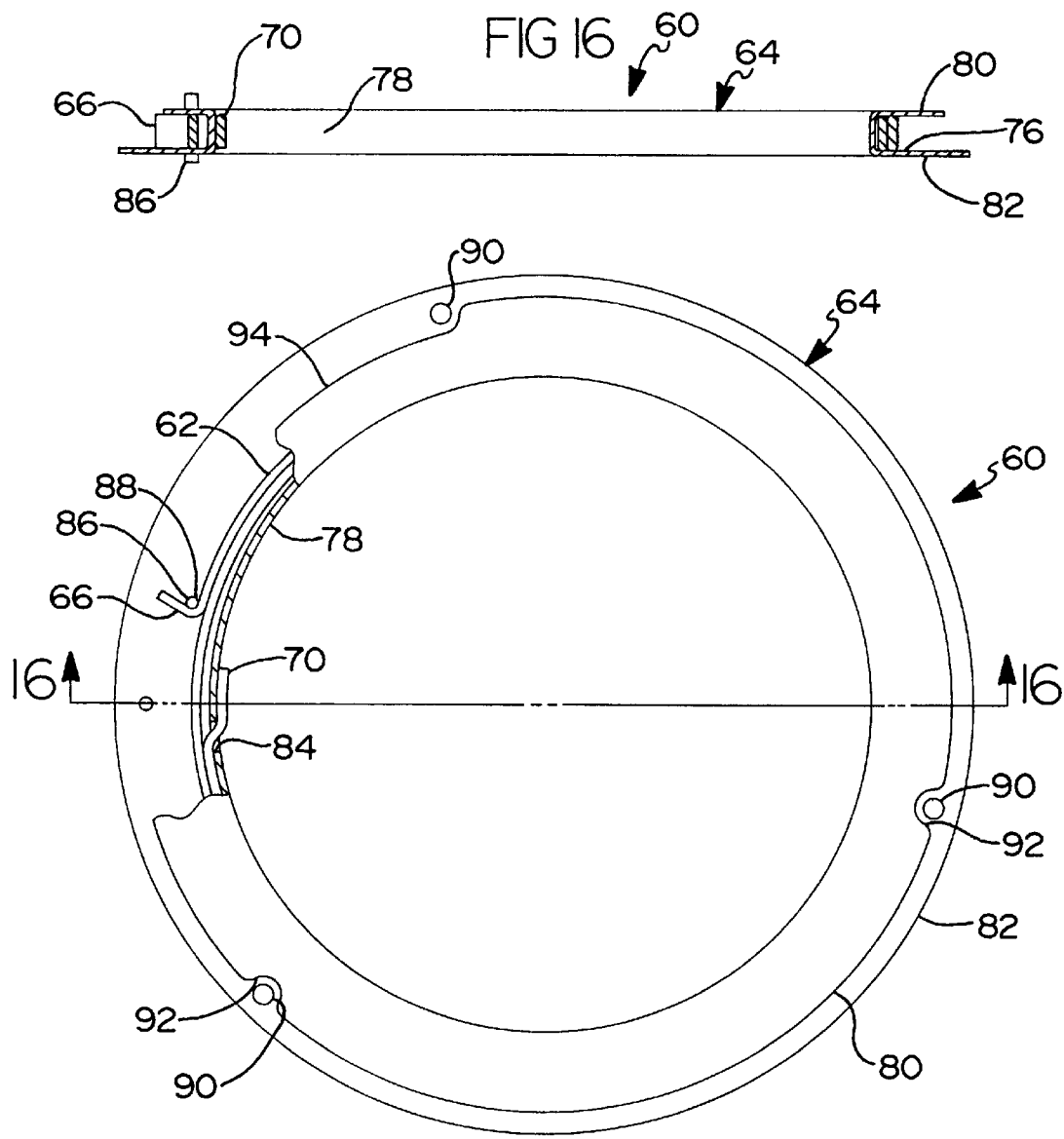

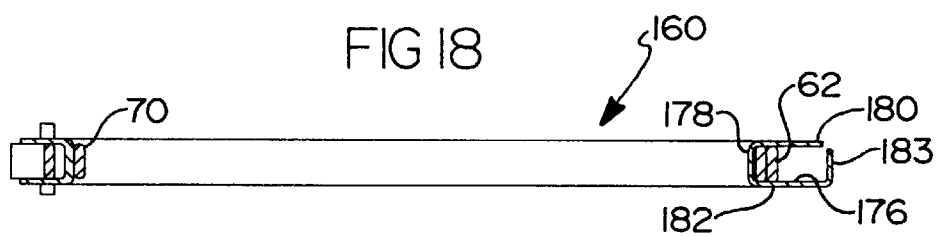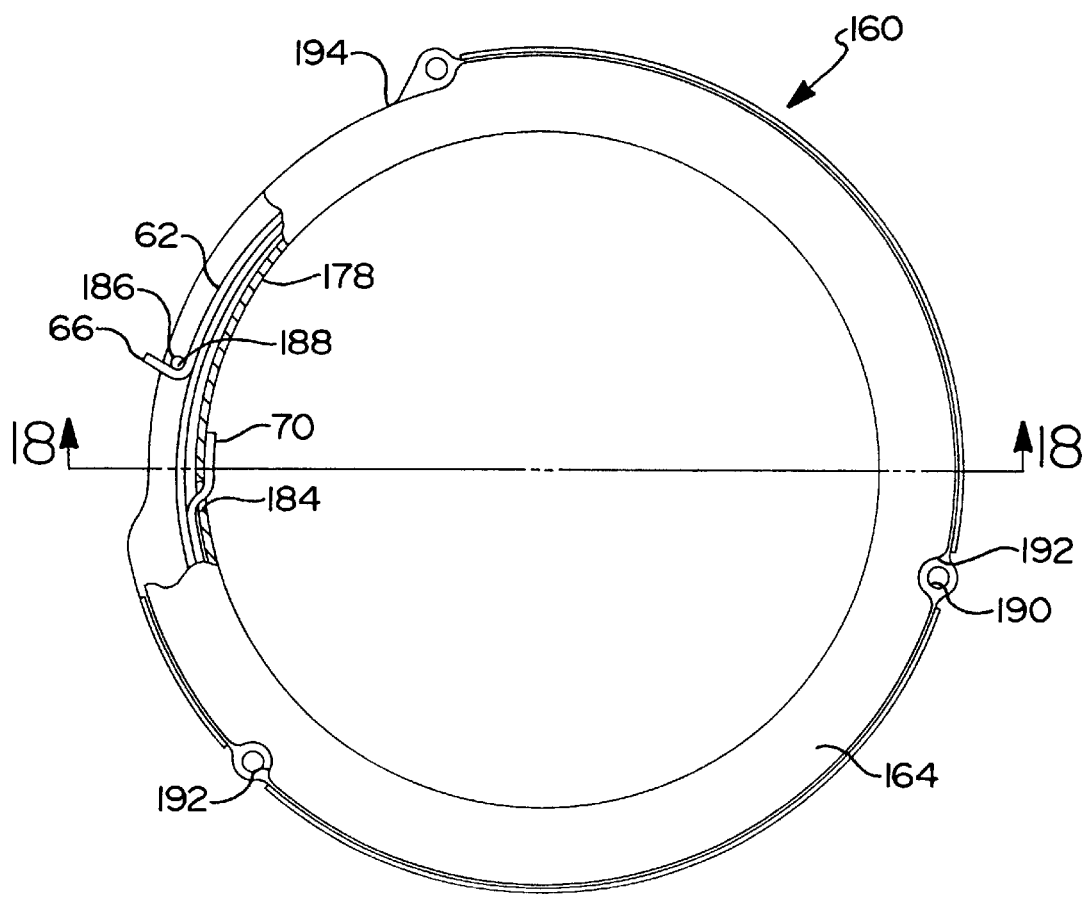

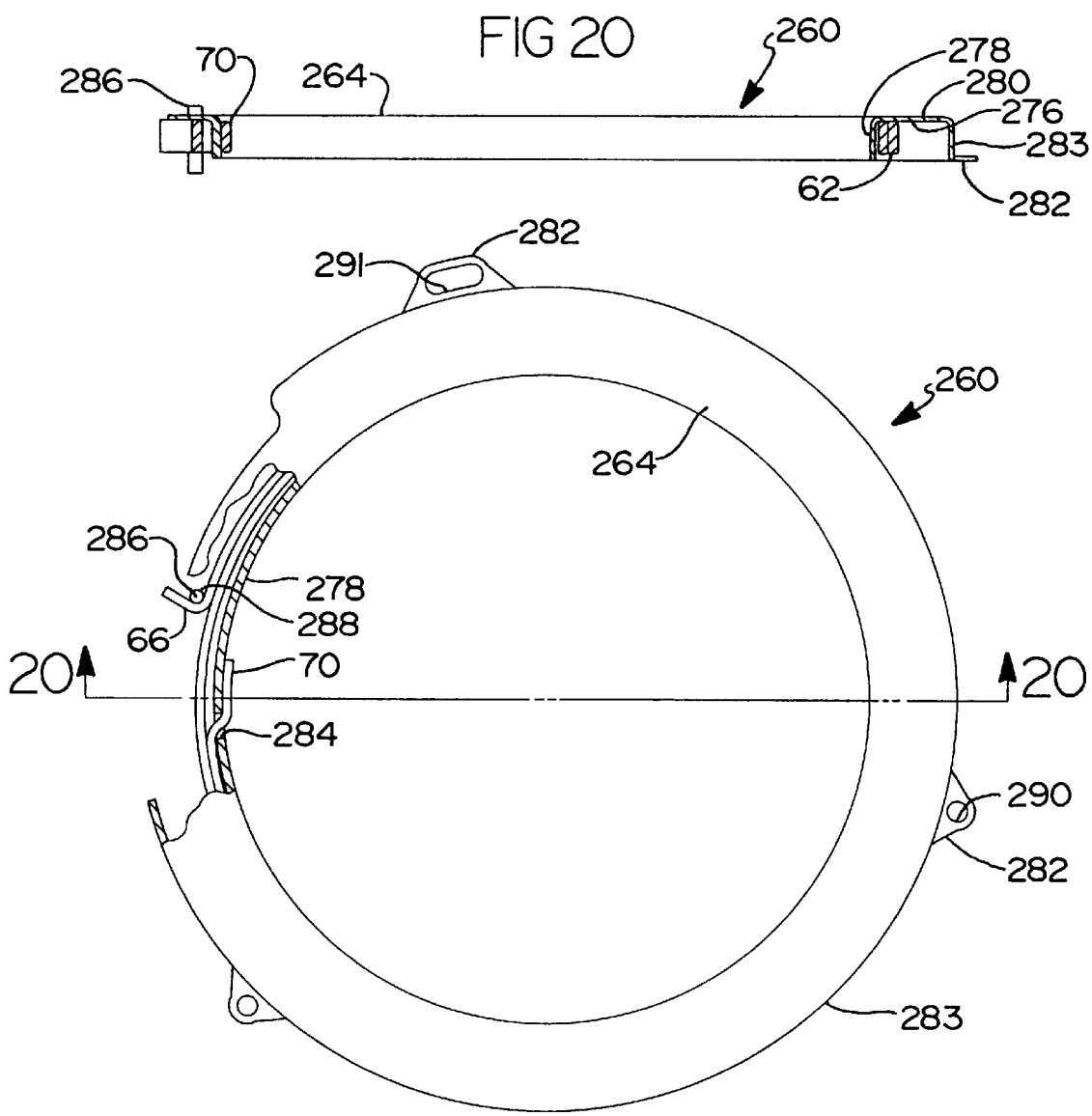

AUTOMATICALLY ADJUSTING FRICTION CLUTCH WITH TORSION SPRING HOUSING

FIELD OF THE INVENTION

This invention relates to the field of friction clutches, and more particularly to friction clutches having automatic adjustment mechanisms.

BACKGROUND OF THE INVENTION

Known friction clutches provide a releasable torsional connection between a motor vehicle engine flywheel and an associated transmission. Repeated clutch disengagement and engagement cycles wear the friction material of the clutch driven disc. The wear results in a change in the axial location of the pressure plate in the engaged position. The shift in axial location results in a progressive decrease in the clutch engagement force or clamping load. Clutches are commonly provided with adjustment mechanisms to compensate for such wear.

The clutch clamping load is generated by a spring acting directly or indirectly against the pressure plate and reacting directly or indirectly against the clutch cover.

One type of spring configuration employs a diaphragm spring having an annular portion with radially inwardly directed fingers extending from the annular portion. The radially innermost tips of the fingers engage a release bearing and bow to deflect the annular portion, and thereby release the clutch, when the release bearing is axially displaced.

Another type of clutch spring configuration applies a spring load to a plurality of radially oriented levers which in turn engage the pressure plate. If compressive coil or angle springs are employed, the spring load is commonly applied to a radially inner end of the levers. The levers are pivotally supported at the radially outer ends. Clutches may employ diaphragm springs in place of coil springs to bias the levers.

As the friction material wears, the engaged position of the radially inner finger or lever tips moves closer to the flywheel. Adjustment mechanisms disposed between the cover and the levers or between the pressure plate and the diaphragm spring compensate for this change.

One type of known adjustment mechanism relies on the relative rotation of two annular cams, each having inclined cam surfaces in engagement with each other. The relative rotation of the cams compensate for wear of the friction material. The cams are biased to rotate in a direction that increases a combined height or thickness of the cam portions. The rotative biasing force is induced by a torsional biasing spring functionally disposed between the two cams. A number of different spring configurations have been employed in this capacity, including coil tension springs, torsional round wire springs, and torsional flat wire springs.

The torsional wire spring, in both round and flat cross section varieties, is particularly advantageous for use as a cam biasing spring, in that it takes up very little space. The flat wire spring is, in one embodiment, radially disposed between an axially extending wall of the pressure plate and a rotatable cam member. A first end of the flat wire spring is fixed to the pressure plate, and a second end of the flat wire spring is fixed to the rotating cam. The spring is hand coiled into the clutch. However, hand coiling the springs is difficult and time-consuming. Additionally, it has been demonstrated that flat wire springs may overlap their coils during operation, reducing the torsional load applied by the spring to the rotatable cam member, and potentially rendering the adjustment mechanism ineffective.

It is desired to provide a mechanism facilitating easier installation of torsional wire springs in a clutch.

It is desired to provide a mechanism which prevents axial overlap of the flat wire spring coils.

It is desired to provide a mechanism which keeps the coils of a torsional wire spring substantially centered with respect to the axis of rotation of the clutch and prevents the interference of the spring coils with adjacent features and/or mechanisms of the clutch.

SUMMARY OF THE INVENTION

A friction clutch for a motor vehicle includes a cover, a pressure plate, a biasing member and an adjustment mechanism. The adjustment mechanism includes a first annular cam, a second annular cam and a torsional spring and housing assembly. The cover has an axis of rotation. The pressure plate is coupled to the cover for rotation therewith about the axis. The pressure plate has a frictional engagement surface substantially normal to the axis. The biasing member is interposed between the cover and the pressure plate, and biases the pressure plate toward an engaged pressure plate position. The adjustment mechanism is centered about the axis and is located at a first radial distance from the axis. The adjustment mechanism is operably disposed between the biasing member and one of the pressure plate and the cover. The first annular cam is rotatably fixed with respect to the pressure plate and the cover. The second annular cam is rotatable relative to the first annular cam. Both cams have a plurality of mutually engaged cam surfaces configured such that rotation of the second cam relative to the first cam in a first direct increases a height of the adjustment mechanism. The torsional spring and housing assembly includes a torsional spring and a housing. The spring is coiled around an inner diameter portion of the housing. The spring arcuately overlaps itself. The spring has a first end connected to the second annular cam ring. The spring has a second end connected to the housing. The housing as an inner diameter portion which serves as a spool for the torsional spring. The housing has a first flange extending radially outwardly from the inner diameter portion. The flange and the inner diameter portion define a channel in which the torsional spring is disposed and retained. The housing is rotatably fixed relative to the pressure plate.

A torsional spring and housing assembly for use with a motor vehicle clutch adjustment mechanism includes a spring, a housing and a selectively removable pin. The spring is coiled around an inner diameter portion of the housing. The spring arcuately overlaps itself. The spring has a first end at a radially outermost end of the spring. The spring has a second end at a radially innermost position which is connected to the housing. The housing has an inner diameter portion which serves as a spool for the torsional spring. The housing has a first flange extending radially outwardly from the inner diameter portion. The flange and the inner diameter portion define a channel in which torsional spring is disposed and retained therein. The selectively removable pin is disposed in an aperture proximate to an outer diameter of the first flange. The pin is engaged by the first end of the spring. The selectively removable pin retains the spring in a wound condition.

The disclosed torsional spring and housing assembly provides a mechanism facilitating easier installation of torsional wire springs in a clutch.

The disclosed torsional spring and housing assembly provides a mechanism which prevents axial overlap of flat wire spring coils.

The disclosed torsional spring and housing assembly provides a mechanism which keeps the coils of a torsional wire spring substantially centered with respect to the axis of rotation of the clutch, thereby preventing interference of the spring coils with adjacent features and/or mechanisms of the clutch.

BRIEF DESCRIPTION OF THE DRAWINGS

FIG. 7 is a perspective view of a cam spring in a free position.

FIG. 8 is a perspective view of the cam spring of FIG. 7 in a worn clutch position.

FIG. 9 is a perspective view of the cam spring of FIG. 7 in a new clutch position.

FIG. 10 is a perspective view of a clutch pressure plate.

FIG. 11 is an enlarged broken-out view of the portion of the cam of FIG. 5 in circle 11.

FIG. 12 is an end view of a torsion spring housing.

FIG. 13 is an enlarged broken-out portion of the housing of FIG. 12 in circle 12.

FIG. 14 is a view of the broken-out portion of FIG. 13 in the direction of arrow 13.

FIG. 15 is an end view of a torsion spring and housing assembly.

FIG. 16 is a view of the assembly of FIG. 15 in the direction of arrows 15.

FIG. 17 is a view of a second embodiment of a torsional spring and housing assembly.

FIG. 18 is a sectional side view of the assembly of FIG. 17 in the direction of arrows 17.

FIG. 19 is an end view of a third embodiment of a torsional spring and housing assembly.

FIG. 20 is a sectional side view of the assembly of FIG. 19 in the direction of arrows 19.

DESCRIPTION OF PREFERRED EMBODIMENTS

Figure 1:
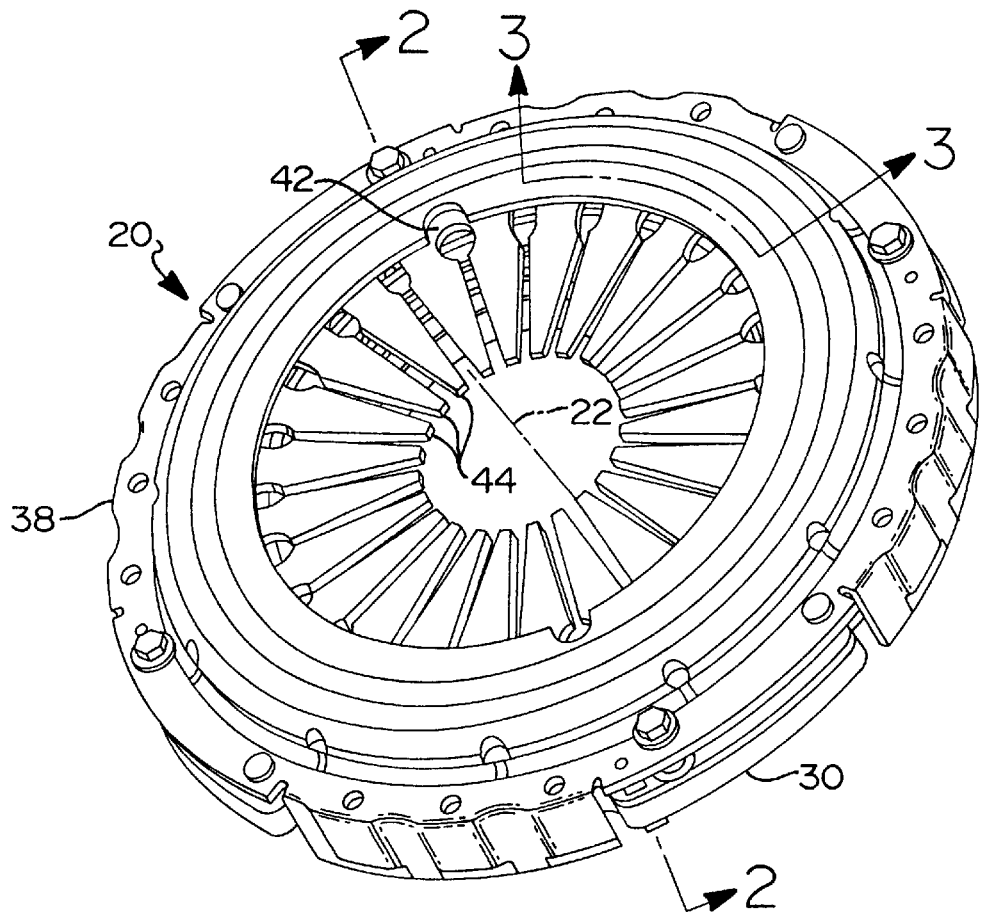
FIG. 1 is a perspective view of a clutch pressure plate and cover assembly.
Figure 3:
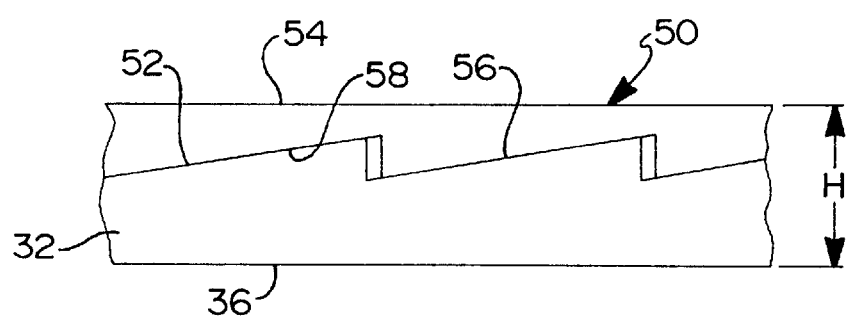
FIG. 3 is a broken-out view of the cams in the direction of arrows 3 of FIG. 1.
Figure 2:
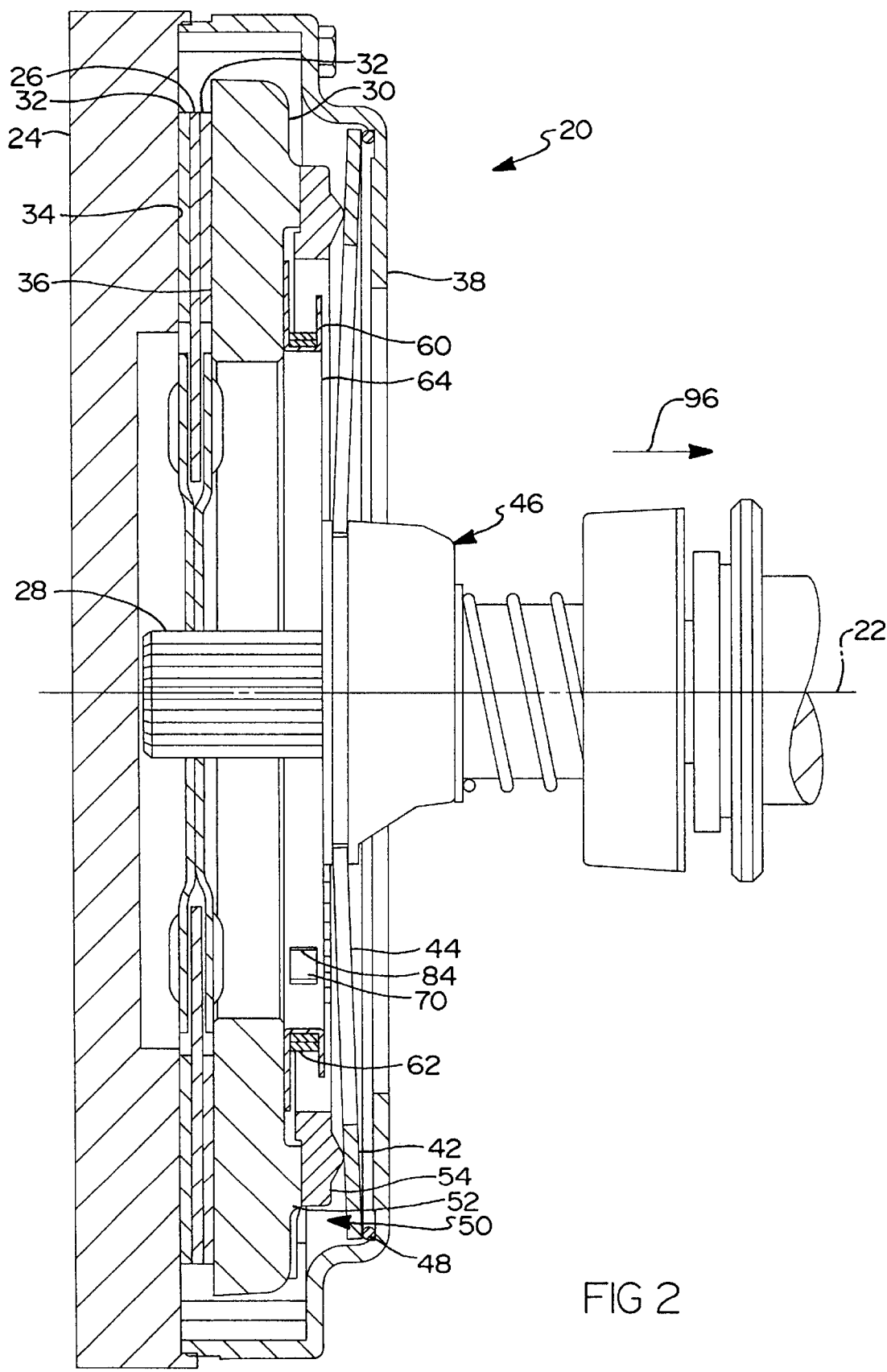
FIG. 2 is a sectional side view of the clutch of FIG. 1 in the direction of arrows 2.

A frictional clutch 20 for a motor vehicle is shown in FIGS. 1 and 2. Clutch 20 rotates about an axis 22. A flywheel 24 is rotatably fixed to a crankshaft of a motor vehicle engine (not shown). A driven disc 26, centered with respect to axis 22, has a splined hub which slidably engages a splined input shaft 28. Driven disc 26 is sandwiched between flywheel 24 and a pressure plate 30. Driven disc 26 has friction elements 32 which are engaged by flywheel engagement surface 34 and pressure plate engagement surface 36 when clutch 20 is in an engaged condition.

Figure 4:
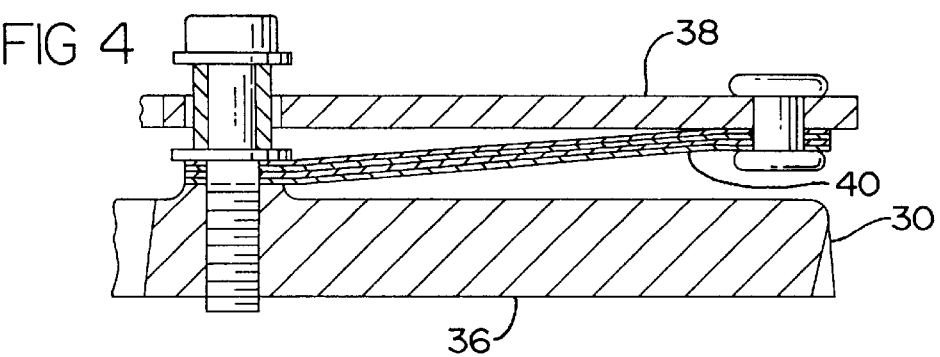
FIG. 4 is a broken-out sectional view of a connection between the pressure plate and the clutch cover.
Figure 5:
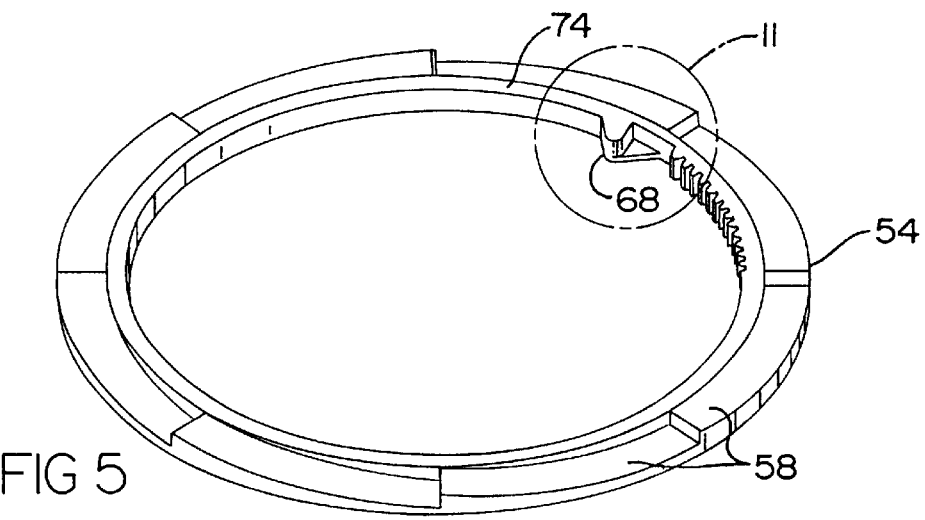
FIG. 5 is a perspective view of a first side of a rotating cam member.
Figure 6:
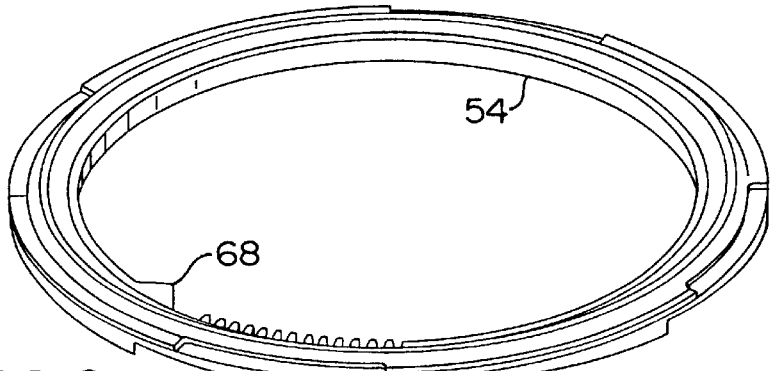
FIG. 6 is a perspective view of the second side of the rotating cam member of FIG. 5.

A cover 38 is disposed over pressure plate 30 and is fixed to flywheel 24. A plurality of straps 40, best shown in FIG. 4, circumferentially extend between pressure plate 30 and cover 38. Straps 40 rotatably fix pressure plate 30 to cover 38 while allowing relative axial displacement of pressure plate 30 to cover 38.

A diaphragm spring 42 is axially disposed between cover 38 and pressure plate 30. An annular portion of diaphragm spring 42 biases pressure plate 30 toward flywheel 24, clamping driven disc 26 therebetween to rotatably connect or lock input shaft 28 with flywheel 24 when clutch 20 is in an engaged position. Diaphragm spring 42 has a plurality of radially inwardly extending spring fingers or levers 44, the radially inner tips of which are engaged by an axially displaceable release assembly 46. A pivot ring 48 is axially disposed between an outer diameter of the annular portion of diaphragm spring 42 and cover 38. Ring 48 facilitates the pivoting or flexing of the annular portion of diaphragm spring 42 relative to cover 38.

Clutch 20 is selectively released or disengaged by axially displacing release assembly 46 along axis 22 in a direction away from flywheel 24. Such displacement is achieved by a vehicle operator through a pedal operated clutch linkage (not shown). As the radially inner tips of fingers 44 are axially displaced away from flywheel 24, fingers 44 bow causing the annular portion of diaphragm spring 42 to deflect, thereby relieving the clamping load against pressure plate 30, and permitting rotation of input shaft 28 relative to flywheel 24.

An adjustment mechanism 50 is disposed between the pressure plate and the diaphragm spring 42 at a location radially inwardly of pivot ring 48. Adjustment mechanism 50 is used to compensate for wear of friction elements 32.

The adjustment mechanism 50 comprises, in its most basic elements, first and second relatively rotatable annular cams and a spring. The spring induces relative rotation between the cams. In the embodiment of FIG. 1, a first cam 52 is stationary or non-rotatable relative to cover 38 and pressure plate 30. Although first cam 52 is shown as formed as a single integral unitary piece with pressure plate 30, it could instead be formed as a separate annular ring, or a plurality of cam segments. Second or rotatable cam 54 is annular in shape and can be formed of any adequately rigid material, including steel and plastic. First cam 52 and second cam 54 have first cam surfaces 56 and second cam surfaces 58 respectively in engagement with each other. Both first cam 52 and second cam 54 are concentric with axis 22. An effective pressure plate thickness H from engagement surface 36 to a fulcrum of second cam 54 is controlled by the relative rotative position of second cam 54 relative to first cam 52. It should be appreciated that the rotatable cam could be disposed against pressure plate 30 and retained by a groove or the like, and the stationary cam disposed against diaphragm spring 42. Additionally, diaphragm spring 42 need not engage either of the cams directly, as a second pivot ring could be used to define the fulcrum.

A torsional spring and housing assembly 60 is fixed to pressure plate 30. Assembly 60 includes a cam spring 62 and a cam spring housing 64 which carries spring 62 as best shown in FIGS. 11–16.

Cam spring 62 has a first end 66 which engages a spring hook 68 of second cam 54. A second end 70 of cam spring 62 is received by a slot in cam spring housing 64. First end 66 has an included angle α of approximately 74° as shown in FIG. 11. The spring hook 68 has an included angle β of approximately 72°. Having angles of less than 90° significantly reduces any tendency of first end 66 to slip off hook 68. A triangular web portion extending between hook 68 and a pilot shoulder 74 of second cam 54 axially traps first end 66 on one side of second cam 54 while pressure plate 30 traps it on the other. FIGS. 7, 8 and 9 show flat wire spring 62 in a free position, a worn position and a new clutch or fully wound position respectively. As drive disc 26 wears, spring 62 unwinds, biasing cam 54 to a position of increased thickness H.

Housing 64 defines a channel 76 therein which guides cam spring 62. Housing 64 has an inner diameter portion 78 and first and second flange portions 80 and 82 respectively, extending radially outwardly from inner diameter portion 78 to define channel 76. Inner diameter portion 78 has a slot or window 84 therein which receives and retains second end 70 of spring 62.

A retaining pin 86 passes through aligned pin apertures 88 in first flange portion 80 and second flange portion 82. Retaining pin 86 is engaged by first end 66 of spring 62 as best shown in FIG. 15. Three mounting apertures 90 are provided in second flange portion 82. Apertures 88 are positioned for alignment with corresponding apertures on pressure plate 30. Clearance notches 92 are provided in first flange portion 80 to accommodate the receipt by apertures 88 of housing to pressure plate fastening means. An undercut 94 is provided along a portion of first flange 80 to accommodate the installation and rotation of second cam 54 relative to housing 64.

The invention is first assembled in the following manner. Second end 70 of spring 62 is passed through window 84. Spring 62 is then coiled in a compressed condition around inner diameter portion 78. Once coiled, pin 86 is passed through apertures 88. First end 66 of spring 62 engages pin 86, maintaining spring 62 in a wound condition. The torsional spring and housing assembly is now ready for installation into clutch 20. Apertures 90 are aligned with corresponding apertures in pressure plate 30 and fastening means such as rivets or screws (not shown) passed therethrough to fix housing 64 to pressure plate 30. Second cam 54 is placed over pressure plate 30 with spring hook 70 disposed in undercut 94. The assembly of clutch 20 is completed. Pin 86 may be removed from apertures 88 after pressure plate has been assembled together with second cam 54, diaphragm spring 42 and cover 38. When pin 86 is removed, first end 66 of spring 62 engages spring hook 68 of second cam 54.

The invention operates in the following manner. When assembled clutch 20 is installed in a vehicle, clutch 20 is selectively disengaged by displacing release assembly 46 in the direction of arrow 96 of FIG. 2. Fingers 44 bow, deflecting the annular portion and relieving pressure plate 30 of the spring load compressing it against driven disc 26. Second cam 54 is initially at a first rotative position corresponding to a minimum height H. When clutch 20 is reengaged, pressure plate engagement surface 36 and flywheel engagement surface 34 act together to clamp relatively rotating friction elements 32 of driven disc 26. As a result of the clamping load, driven disc 26 is brought to the same speed as flywheel 24 and pressure plate 30. Repeated disc engagement and re-engagement cycles wear friction elements 32. The axial location of pressure plate 30 in the engaged condition resultantly shifts closer toward flywheel 24. However, an essentially constant spring force or clamping force is maintained due to the adjustment provided by the relative rotation of second cam 54 relative to first cam 52. In a released condition, when the axial load attributable to diaphragm spring 42 against adjustment mechanism 50 is substantially eliminated, biasing spring 62 causes second cam 54 to rotate. As cam 54 rotates, height H increases, ideally in an amount equal to the amount of wear of friction elements 32. As cam 54 rotates, spring 62 unwinds. As spring 62 unwinds, first flange portion 80 and second flange portion 82 keep spring 62 axially constrained, thereby preventing the axial overlap of spring coils.

FIGS. 17 and 18 show a second embodiment of a torsional spring and housing assembly 160. Spring 62 is disposed within cam spring housing 164. Housing 164 defines a channel 176 which is substantially closed on all four sides for most of the circumference of housing 164. Housing 164 has an inner diameter portion 178 with radially extending first and second flange portions 180 and 182 respectively. Cam spring housing 164 also has an outer diameter portion 183 extending axially upward from second flange portion to a radially outer portion of first flange portion 180. Outer diameter portion 183 serves to completely enclose the coils of spring 62 on all four sides.

As with housing 64, housing 164 also includes a window 184, pin apertures 188, mounting apertures 190, clearance notches 192 and an undercut 194. A retaining pin 186 is used to hold the first end 66 of spring 62 in place during shipping. Spring and housing assembly 160 prevents spring 62 from excessive eccentric shifting when in expanded condition, as would be the circumstance when friction elements 32 experience a substantial amount of wear.

FIGS. 19 and 20 show a third embodiment of a torsional spring and housing assembly 260. A cam spring housing 264 is provided which forms a channel 276 that is open in the area corresponding to the second flange 82, 182 of housings 64 and 164 respectively. Housing 264 has an inner diameter portion 278 from which a first flange portion 280 extends radially outwardly. An outer diameter portion 283 extends axially in parallel with inner diameter portion 278. Tabs 282 extend radially outwardly from outer diameter portion 283 at a location corresponding to the radially outermost portions of second flange portions 82 and 182. As in the other embodiments, a window 284 is disposed in inner diameter portion 278. A pin aperture 288 passes through first flange portion 280. Mounting apertures 290 pass through tabs 282 instead of second flange portion 82, 182. A mounting slot 291 passes through one of the three tabs 282. The open side of channel 276 is closed once assembly 260 is installed on pressure plate 30. The mating surface of pressure plate 30 serves to close channel 276. The configuration of cam spring housing 264 is advantageous in that it is more easily formed than housing 64 and housing 164. Housing 264 also uses less material than does housing 164. Housing 264 has an outer diameter portion which retain the coils of spring 62 in a substantially concentric condition and prevents the coils from undesirable engagement with other elements of the clutch.

It should be appreciated that there are readily apparent alternative embodiments to the above described clutch configurations. For example, a torsional biasing spring having a round instead of a flat cross section may be used. Yet alternatively, different engagement mechanisms may be employed for connecting the spring to the housing and for connecting the spring to the rotatable cam. Further, the described torsional biasing spring and housing assembly may be employed with clutches having different configurations, including angle spring clutches or clutches in which the adjusting mechanisms is disposed against the cover instead of against the pressure plate. Additionally, the locations of the rotating cam and the stationary cam may be transposed.

The embodiments disclosed herein have been discussed for the purpose of familiarizing the reader with the novel aspects of the invention. Although preferred embodiments of the invention have been shown and disclosed, many changes, modifications and substitutions may be made by one having ordinarily skill in the art without necessarily departing from the spirit and scope of the invention as described in the following claims.

I claim:

1. A friction clutch for a motor vehicle comprising:

a cover having an axis of rotation;

a pressure plate coupled to the cover for rotation therewith about the axis and having a frictional engagement surface substantially normal to the axis;

a biasing member interposed between the cover and the pressure plate biasing the pressure plate toward an engaged pressure plate position;

an adjustment mechanism centered about the axis and located at a first radial distance from the axis operably disposed between the biasing member and one of the pressure plate and the cover, the adjustment mechanism including:

a first annular cam rotatably fixed with respect to the pressure plate and the cover, a second annular cam rotatable relative to the first annular cam and both cams having a plurality of mutually engaged cam surfaces configured such that rotation of the second cam relative to the first cam in a first direction increases a height of the adjustment mechanism, and a torsional spring and housing assembly, including a torsional spring and a housing, the spring being coiled around an inner diameter portion of the housing and the spring arcuately overlapping itself and the spring having a first end connected to the second annular cam ring and the spring having a second end connected to the housing, and the housing having an inner diameter portion serving as a spool for the torsional spring, and the housing having a first flange extending radially outwardly from the inner diameter portion and the housing having a second flange extending radially outward from the inner diameter portion with the inner diameter portion, the first flange and the second flange and the inner diameter portion defining a channel in which the torsional spring is disposed and retained therein and the housing being rotatively fixed relative to the pressure plate.

2. A friction clutch as claimed in claim 1 wherein:

the housing further includes an axially extending outer diameter portion which extends from one of the first and second flanges toward the other of the first and second flanges further wherein the outer diameter portion restricts radially outwardly displacement of the spring.

3. A friction clutch as claimed in claim 1 wherein the housing is fixedly mounted to the pressure plate on a side of the housing opposite the first flange, and the channel is defined by the inner diameter portion, the first flange and a side of the pressure plate engaged by the housing.

4. A friction clutch as claimed in claim 4 wherein an outer diameter portion extends axially from the first flange toward the pressure plate and closes the channel and restricts radially outwardly displacement of the spring.

5. A friction clutch as claimed in claim 4 wherein the housing is fixed to the pressure plate.

6. A friction clutch as claimed in claim 1 wherein the first end of the torsional spring extends radially outwardly and has an included angle of less than 90° and a radially inwardly extending spring hook of the second cam also has an included angle of less than 90°.

7. A friction clutch as claimed in claim 1 wherein the housing has a window receiving the second end of the torsional spring.

8. A friction clutch as claimed in claim 1 wherein the channel has a first dimension approximately equal to a first dimension of the torsional spring, thereby preventing axial overlap between coils of the torsional spring.

9. A torsional spring and housing assembly for use with a motor vehicle clutch adjustment mechanism, the torsional spring and housing assembly comprising:

a spring coiled around an inner diameter portion of the housing and the spring arcuately overlapping itself and the spring having a first end at a radially outermost end of the spring and the spring having a second end at a radially innermost position connected to the housing;

the housing having an inner diameter portion serving as a spool for the torsional spring and the housing having a first flange extending radially outwardly from the inner diameter portion and the flange and inner diameter portion defining a channel in which the torsional spring is disposed and retained therein; and a selectively removable pin being disposed in an aperture proximate to an outer diameter of the first flange and the pin being engaged by the first end of the spring, and thereby retaining the spring in a wound condition.

10. A torsional spring and housing assembly as claimed in claim 9 wherein the channel has a first dimension approximately equal to a first dimension of the torsional spring, thereby preventing axial overlap between coils of the torsional spring.

11. A torsional spring and housing assembly as claimed in claim 10 wherein:

the housing has a second flange extending radially outwardly from the inner diameter portion, the channel being defined by the inner diameter portion and the first flange and the second flange.

12. A torsional spring and housing assembly as claimed in claim 11 wherein:

the housing further includes an axially extending outer diameter portion which extends from one of the first and second flanges toward the other of the first and second flanges further wherein the outer diameter portion restricts radially outwardly displacement of the spring.

13. A torsional spring and housing assembly as claimed in claim 10 wherein the housing has a window receiving the second end of the torsional spring.

* * * * *

UNITED STATES PATENT AND TRADEMARK OFFICE
CERTIFICATE OF CORRECTION

PATENT NO. : 6,053,297
DATED : April 25, 2000
INVENTOR(S) : Kummer

It is certified that error appears in the above-identified patent and that said Letters Patent is hereby corrected as shown below:

Claim 4, column 7, line 60, delete "4" and insert --3--.

Claim 5, column 8, line 3, delete "4" and insert --3--.

Claim 11, column 8, line 44, delete "10" and insert --9--.

Claim 13, column 8, line 58, delete "10" and insert --9--.

Signed and Sealed this

Twentieth Day of February, 2001

*Attest:*

NICHOLAS P. GODICI

*Attesting Officer*     Acting Director of the United States Patent and Trademark Office